United States Patent
Venäläinen et al.

(10) Patent No.: US 12,347,049 B2
(45) Date of Patent: Jul. 1, 2025

(54) VISUALIZING AREA COVERED BY DRONE CAMERA

(71) Applicant: ANARKY LABS OY, Helsinki (FI)

(72) Inventors: Ilkka Venäläinen, Helsinki (FI); Lassi Immonen, Helsinki (FI); Hannu Lesonen, Helsinki (FI)

(73) Assignee: Anarky Labs Oy, Helsinki (FI)

( * ) Notice: Subject to any disclaimer, the term of this patent is extended or adjusted under 35 U.S.C. 154(b) by 0 days.

(21) Appl. No.: 18/609,471

(22) Filed: Mar. 19, 2024

(65) Prior Publication Data
US 2025/0131664 A1    Apr. 24, 2025

Related U.S. Application Data

(63) Continuation of application No. 18/491,086, filed on Oct. 20, 2023, now Pat. No. 11,967,035.

(51) Int. Cl.
| | |
|---|---|
| *G06T 19/00* | (2011.01) |
| *G01C 21/36* | (2006.01) |
| *G02B 27/01* | (2006.01) |
| *G06V 10/74* | (2022.01) |
| *G06V 20/17* | (2022.01) |

(52) U.S. Cl.
CPC ........ *G06T 19/006* (2013.01); *G01C 21/3635* (2013.01); *G02B 27/0172* (2013.01); *G06V 10/761* (2022.01); *G06V 20/17* (2022.01); *G06V 2201/07* (2022.01)

(58) Field of Classification Search
CPC .............. G06T 19/006; G01C 21/3635; G02B 27/0172; G06V 10/761; G06V 20/17; G06V 2201/07
See application file for complete search history.

(56) References Cited

U.S. PATENT DOCUMENTS

| | | | |
|---|---|---|---|
| 10,907,977 B1 | 2/2021 | Markovic | |
| 11,967,035 B1* | 4/2024 | Venäläinen | ............ G06V 20/17 |
| 2010/0269143 A1 | 10/2010 | Rabowsky | |
| 2016/0274358 A1* | 9/2016 | Yajima | ..................... G06F 3/013 |
| 2016/0327946 A1 | 11/2016 | Koga | |
| 2017/0358141 A1* | 12/2017 | Stafford | ................... G06T 7/246 |
| 2020/0050417 A1* | 2/2020 | Araújo | ............... G02B 27/0172 |
| 2021/0366202 A1* | 11/2021 | Xu | ........................... G06F 3/147 |
| 2022/0205791 A1 | 6/2022 | Okamori | |

* cited by examiner

*Primary Examiner* — Jeffery A Brier
(74) *Attorney, Agent, or Firm* — Nixon & Vanderhye PC

(57) ABSTRACT

Disclosed is a method including receiving data associated with at least one drone, where the data at least indicates one or more areas covered by at least one camera of the at least one drone in a real-world environment; and superimposing, on a head-mounted display, a visualization indicating the one or more areas covered by the at least one camera of the at least one drone, where the visualization is superimposed on at least one of: the one or more areas in the real-world environment, or a virtual map of the real-world environment.

16 Claims, 11 Drawing Sheets

VISUALIZING AREA COVERED BY DRONE CAMERA

CROSS-REFERENCE TO RELATED APPLICATION

This application is a continuation of Ser. No. 18/491,086 filed Oct. 20, 2023, the entire contents of which are hereby incorporated by reference.

FIELD

Various example embodiments relate to drones and to head-mounted displays.

BACKGROUND

A head-mounted display may be used to assist a user in controlling a drone.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising: an internal data communication interface configured to receive data associated with at least one drone, wherein the data at least indicates one or more areas covered by at least one camera of the at least one drone in a real-world environment; a head-mounted display; one or more memories including computer program code; and one or more processors configured to execute the computer program code to cause the apparatus to perform at least the following: superimposing, on the head-mounted display, a visualization indicating the one or more areas covered by the at least one camera of the at least one drone, wherein the visualization is superimposed on at least one of: the one or more areas in the real-world environment, or a virtual map of the real-world environment.

According to another aspect, there is provided an apparatus comprising at least one processor, and at least one memory storing instructions that, when executed by the at least one processor, cause the apparatus at least to: receive data associated with at least one drone, wherein the data at least indicates one or more areas covered by at least one camera of the at least one drone in a real-world environment; and superimpose, on a head-mounted display, a visualization indicating the one or more areas covered by the at least one camera of the at least one drone, wherein the visualization is superimposed on at least one of: the one or more areas in the real-world environment, or a virtual map of the real-world environment.

According to another aspect, there is provided an apparatus comprising: means for receiving data associated with at least one drone, wherein the data at least indicates one or more areas covered by at least one camera of the at least one drone in a real-world environment; and means for superimposing, on a head-mounted display, a visualization indicating the one or more areas covered by the at least one camera of the at least one drone, wherein the visualization is superimposed on at least one of: the one or more areas in the real-world environment, or a virtual map of the real-world environment.

According to another aspect, there is provided a method comprising: receiving data associated with at least one drone, wherein the data at least indicates one or more areas covered by at least one camera of the at least one drone in a real-world environment; and superimposing, on a head-mounted display, a visualization indicating the one or more areas covered by the at least one camera of the at least one drone, wherein the visualization is superimposed on at least one of: the one or more areas in the real-world environment, or a virtual map of the real-world environment.

According to another aspect, there is provided a computer program comprising instructions which, when executed by an apparatus, cause the apparatus to perform at least the following: receiving data associated with at least one drone, wherein the data at least indicates one or more areas covered by at least one camera of the at least one drone in a real-world environment; and superimposing, on a head-mounted display, a visualization indicating the one or more areas covered by the at least one camera of the at least one drone, wherein the visualization is superimposed on at least one of: the one or more areas in the real-world environment, or a virtual map of the real-world environment.

According to another aspect, there is provided a computer readable medium comprising program instructions which, when executed by an apparatus, cause the apparatus to perform at least the following: receiving data associated with at least one drone, wherein the data at least indicates one or more areas covered by at least one camera of the at least one drone in a real-world environment; and superimposing, on a head-mounted display, a visualization indicating the one or more areas covered by the at least one camera of the at least one drone, wherein the visualization is superimposed on at least one of: the one or more areas in the real-world environment, or a virtual map of the real-world environment.

According to another aspect, there is provided a non-transitory computer readable medium comprising program instructions which, when executed by an apparatus, cause the apparatus to perform at least the following: receiving data associated with at least one drone, wherein the data at least indicates one or more areas covered by at least one camera of the at least one drone in a real-world environment; and superimposing, on a head-mounted display, a visualization indicating the one or more areas covered by the at least one camera of the at least one drone, wherein the visualization is superimposed on at least one of: the one or more areas in the real-world environment, or a virtual map of the real-world environment.

LIST OF DRAWINGS

Some embodiments will now be described with reference to the accompanying drawings, in which FIG. 1A illustrates an example of an apparatus;
FIG. 1B illustrates an example of an apparatus;
FIG. 2A illustrates an example embodiment;
FIG. 2B illustrates an example embodiment;
FIG. 3 illustrates an example embodiment;
FIG. 4A illustrates an example embodiment;
FIG. 4B illustrates an example embodiment;
FIG. 5A illustrates an example embodiment;
FIG. 5B illustrates an example embodiment;
FIG. 6A illustrates an example embodiment;
FIG. 6B illustrates an example embodiment;
FIG. 6C illustrates an example embodiment;
FIG. 7A illustrates an example embodiment;
FIG. 7B illustrates an example embodiment;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Furthermore, the words "comprising" and "including" should be understood as not limiting the described embodiments to consist of only those features that have been mentioned, and such embodiments may also contain features that have not been specifically mentioned. Reference numbers, in the description and/or in the claims, serve to illustrate the embodiments with reference to the drawings, without limiting it to these examples only.

Figure 1A:
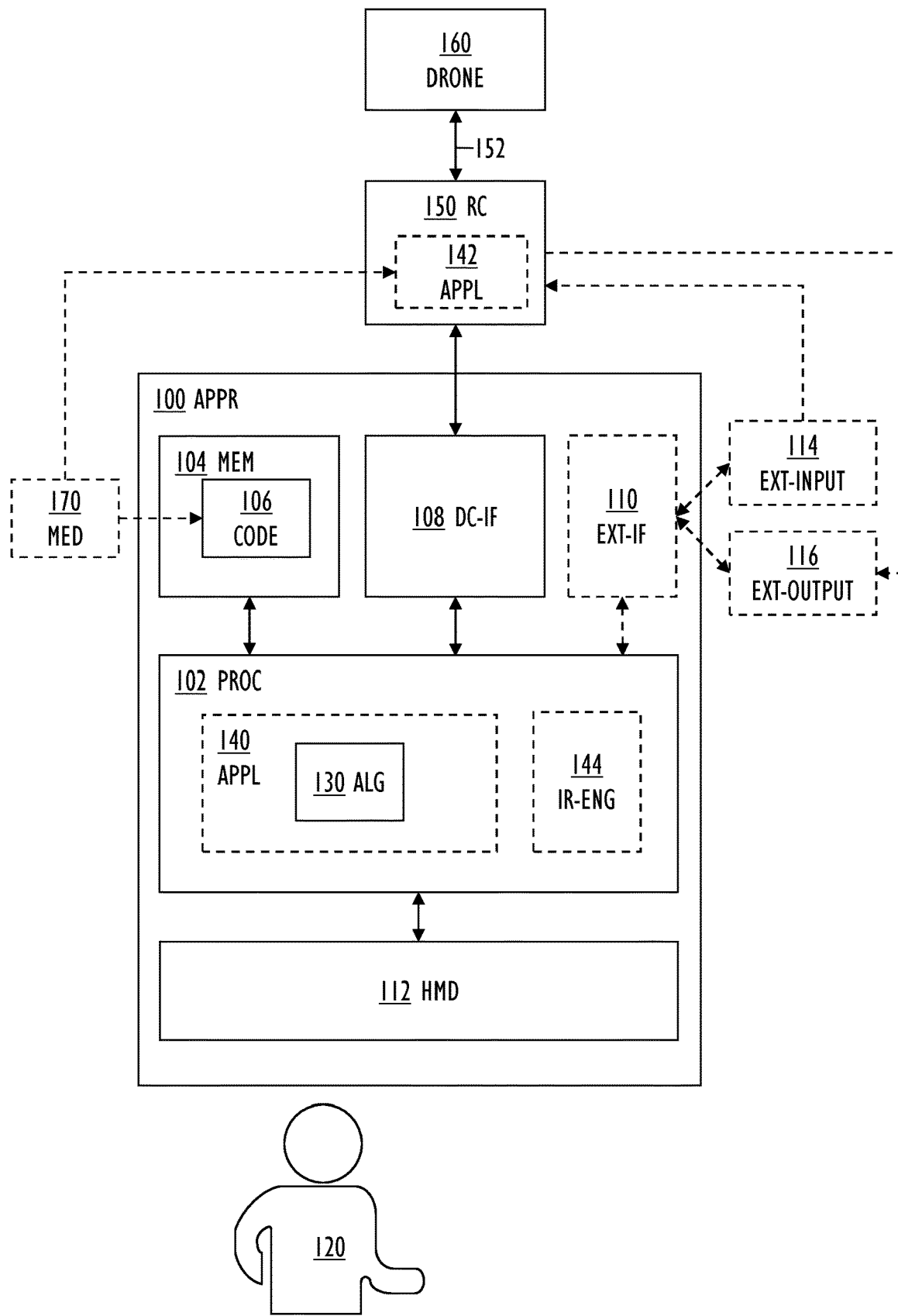

FIG. 1A illustrates a simplified block diagram of an apparatus 100 for assisting a user 120 in observing and/or controlling at least one drone 160. The at least one drone 160 may be configured to operate autonomously, or the at least one drone 160 may be controlled by the user 120 (or another user) with a remote controller 150 or other means.

Herein a drone may refer to, for example, an unmanned aerial vehicle (UAV), or an unmanned underwater vehicle (UUV), or a ground-based robot or automated guided vehicle (AGV). A control system for the at least one drone 160 may be defined as including the at least one drone 160, the remote controller 150, and a wireless communications system 152 between the remote controller 150 and the at least one drone 160. Alternatively, an autonomous drone may be operated by a computer system and programmed to fly autonomously, without the need for a human operator or the remote controller 150.

The apparatus 100 comprises an internal data communication interface 108 configured to receive data associated with the at least one drone 160. The data may be received from at least one of: the remote controller 150, the at least one drone 160, another apparatus 100 of another user, a mobile device or application, or the internet (e.g., from a command center or third-party service or map service).

The data may at least indicate one or more areas covered by at least one camera of the at least one drone 160. For example, the data may comprise at least: a location (e.g., latitude, longitude and/or altitude) of the at least one drone 160 in the real-world environment, a direction of the at least one drone 160, an orientation of the at least one camera, and a frustum of the at least one camera. The data may be received continuously over time.

The data may further comprise digital twin data of the real-world environment where the at least one drone 160 is in. This digital twin data facilitates the generation of a computer-simulated replica (digital/virtual representation) of the corresponding real-world environment. For example, the digital twin data May comprise, but is not limited to, a digital twin model of a building in the same geographical location and orientation as the real physical building in the real-world environment, such that graphical (digital) visualizations or indications may be superimposed or projected onto the virtual surface of the digital twin model.

The data may further comprise, for example, at least one of: a (real-time and/or stored) video feed and/or one or more (real-time and/or stored) pictures from the at least one camera of the at least one drone, angular rate, velocity, yaw, pitch, roll angles, motor rotations per minute (RPM), battery status, gimbal orientation, mission status (e.g., flight duration), and/or sensor readings such as gyroscope data, magnetometer data, light detection and ranging (LIDAR) data, sonar data, infrared data, barometric pressure data, wind speed and direction data, and/or ambient temperature data, etc.

The internal data communication interface 108 may be implemented, for example, using a wireless radio transceiver configured to communicate with a wireless transceiver of the remote controller 150 and/or the at least one drone 160. The technologies for the internal data communication interface 108 may include, but are not limited to, one or more of the following: a wireless local area network (WLAN) implemented using an IEEE 802.11 standard or a Wi-Fi protocol suite, a short-range radio network such as Bluetooth or Bluetooth low energy (LE), a cellular radio network employing a subscriber identity module (SIM) or an embedded subscriber identity module (eSIM), or another standard or proprietary wireless connectivity means. Note that in some use cases, the internal data communication interface 108 may additionally or alternatively utilize a standard or proprietary wired connection, such as the universal serial bus (USB) standard.

The apparatus 100 also comprises a head-mounted display (HMD) 112 configured to present the user 120 of the apparatus 100 with computer-generated sensory input. For example, the data associated with the at least one drone 160 may be superimposed (or overlaid) on the head-mounted display 112 in addition to the real-world environment and the at least one drone 160.

For example, the head-mounted display 112 may comprise an augmented reality (AR) display, or a virtual reality (VR) display, or a mixed reality (MR) display. However, also other applicable implementations of the head-mounted display 112 may be used, including, but not limited to: eyeglasses, a heads-up display (HUD), contact lenses with an augmented reality imaging, etc.

The head-mounted display 112 may be attached to the head of the user 120 with a headband or be helmet-mounted and worn as a visor in front of the eyes of the user 120. In one example, the head-mounted display 112 may be implemented as a see-through display on which holographic images may be displayed. In another example, the head-mounted display 112 may employ cameras to intercept the real-world view and display an augmented view of the real world as a projection.

The apparatus 100 may comprise an immersive reality engine 144 configured to handle the basic operations related to integrating real-world views with digital content, and to track the head and eye movements of the user 120. For example, the immersive reality engine 144 may track the position, orientation, head direction and gaze direction of the user 120. The immersive reality engine 144 may comprise an augmented reality engine, virtual reality engine, or mixed reality engine.

The apparatus 100 may comprise, for example, one or more processors 102 (e.g., including a system on a chip, a custom-made holographic processing unit, and a coprocessor), one or more memories 104 including computer program code (software) 106, a depth camera, a video camera, projection lenses, an inertial measurement unit (e.g., including an accelerometer, a gyroscope, and a magnetometer), a wireless connectivity unit 108, 110, and a rechargeable battery. Note that some of these parts are not illustrated in FIG. 1A.

Figure 9:
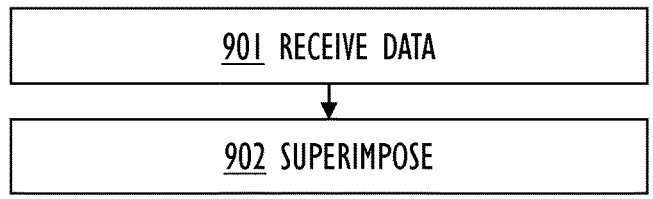
FIG. 9 illustrates a flow chart according to an example embodiment.
Figure 10:
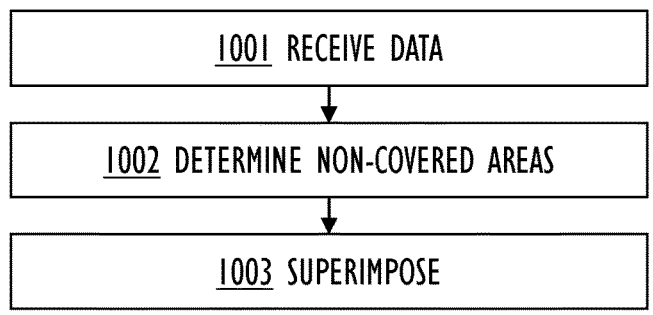
FIG. 10 illustrates a flow chart according to an example embodiment.
Figure 11:
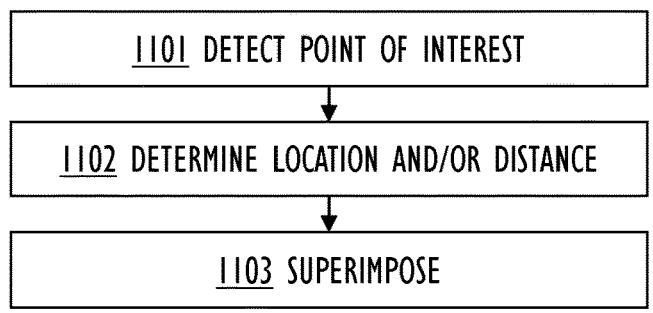
FIG. 11 illustrates a flow chart according to an example embodiment.

The one or more processors 102 may be configured to execute the computer program code 106 to cause the apparatus 100 to perform the required data processing. The data processing performed by the apparatus 100 may be construed as a method or an algorithm 130, for example as shown in at least one of: FIG. 9, FIG. 10, FIG. 11, and/or FIG. 12.

The term 'processor' 102 refers to a device that is capable of processing data. In one example, the processor 102 may be implemented as a microprocessor implementing functions of a central processing unit (CPU) on an integrated circuit. The CPU is a logic machine executing the computer program code 106. The CPU may comprise a set of registers, an arithmetic logic unit (ALU), and a control unit (CU). The control unit is controlled by a sequence of the computer program code 106 transferred to the CPU from the (working) memory 104. The control unit may contain a number of microinstructions for basic operations. The implementation of the microinstructions may vary, depending on the CPU design. The one or more processors 102 may be implemented as cores of a single processor and/or as separate processors.

The term 'memory' 104 refers to a device that is capable of storing data run-time (i.e., working memory) or permanently (i.e., non-volatile memory). The working memory and the non-volatile memory may be implemented by a random-access memory (RAM), dynamic RAM (DRAM), static RAM (SRAM), a flash memory, a solid-state disk (SSD), PROM (programmable read-only memory), a suitable semiconductor, or any other means of implementing an electrical computer memory.

The computer program code 106 is implemented by software. In an embodiment, the software may be written in a suitable programming language, and the resulting executable code may be stored in the memory 104 and executed by the one or more processors 102.

The computer program code 106 implements the method or algorithm 130. The computer program code 106 may be coded as a computer program (or software) using a programming language, which may be a high-level programming language, such as C, C++, or Rust, for example. The computer program code 106 may be in source code form, object code form, executable file, or in some intermediate form, but for use in the one or more processors 102 it is in an executable form as an application 140. There are many ways to structure the computer program code 106: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program code 106 for performing a wide variety of standard operations. In addition, an operating system (such as a general-purpose operating system) may provide the computer program code 106 with system services.

One example embodiment provides a computer-readable medium 170 storing the computer program code 106, which, when loaded into the one or more processors 102 and executed by one or more processors 102, causes the one or more processors 102 to perform the method or algorithm 130, for example as shown in at least one of: FIG. 9, FIG. 10, FIG. 11, and/or FIG. 12. The computer-readable medium 170 may comprise at least the following: any entity or device capable of carrying the computer program code 106 to the one or more processors 102, a record medium, a computer memory, a read-only memory, an electrical carrier signal, a telecommunications signal, and a software distribution medium. In some jurisdictions, depending on the legislation and the patent practice, the computer-readable medium 170 may not be the telecommunications signal. In an embodiment, the computer-readable medium 170 may be a computer-readable storage medium. In an embodiment, the computer-readable medium 170 may be a non-transitory computer-readable storage medium.

Figure 1B:
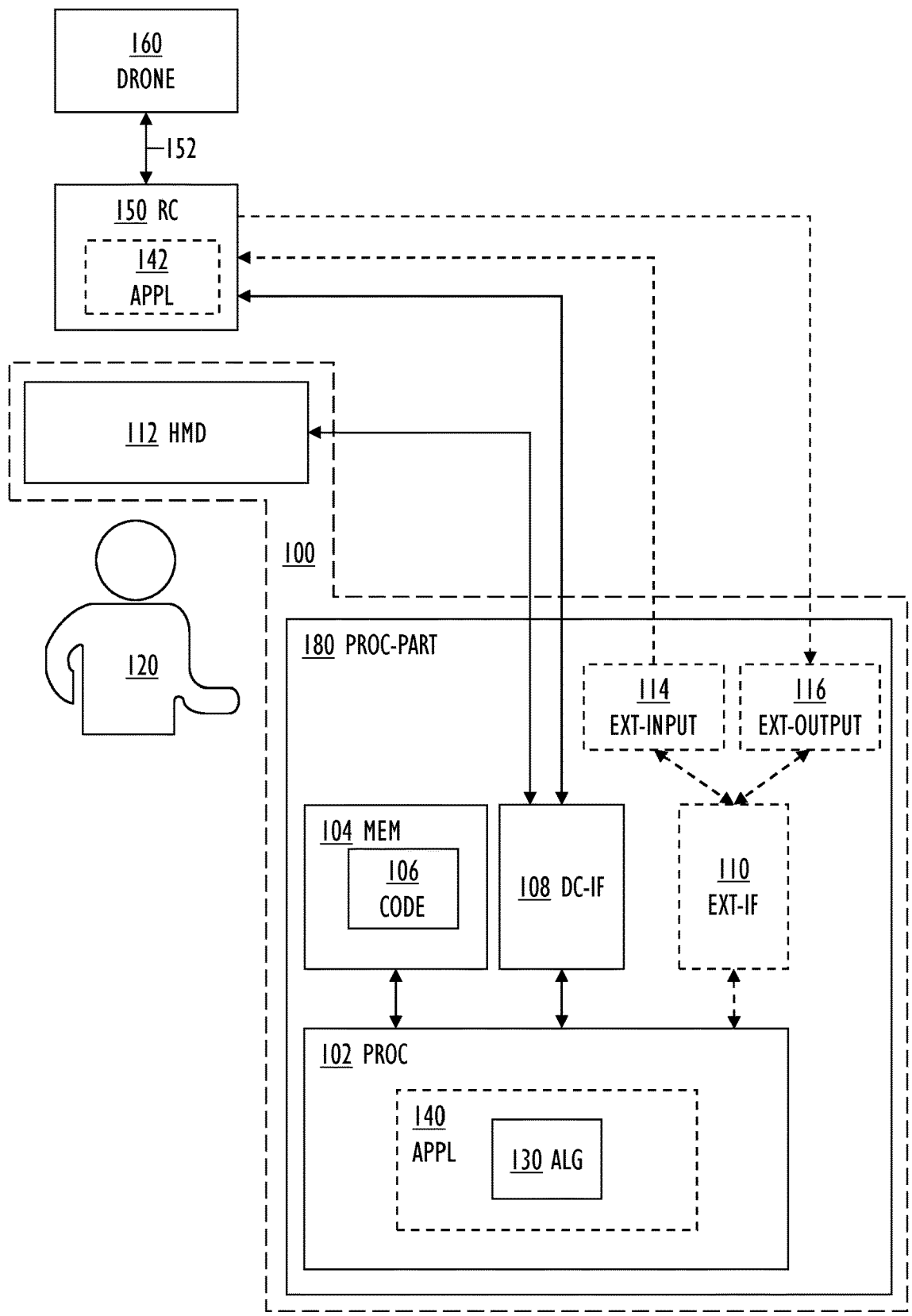

As shown in FIG. 1A and FIG. 1B, the computer-readable medium 170 may carry the computer program code 160 as the executable application 140 for the apparatus 100, and as an executable application 142 for the remote controller 150 to transmit the data associated with the at least one drone 160 to the apparatus 100. In some drone environments, a software development kit may be used for the application 142 to interface with the remote controller 150.

FIG. 1A illustrates the apparatus 100 as an integrated unit comprising the head-mounted display 112, the one or more memories 104 including the computer program code 106, and the one or more processors 102.

However, as illustrated in FIG. 1B, the apparatus 100 may also be implemented as a distributed apparatus 100 so that the user 120 is provided with the head-mounted display 112, but with a separate processing part 180, which is communicatively coupled with the head-mounted display 112 and/or the remote controller 150, and which comprises the one or more memories 104 including the computer program code 106, and the one or more processors 102. This may be implemented so that the processing part 180 is a user apparatus such as a smartphone, tablet computer or a portable computer carried by the user 120, and the communication coupling may be wired or wireless. Another implementation is such that the processing part 180 is a networked computer server, which interoperates with the head-mounted display 112 according to a client-server architecture, a cloud computing architecture, a peer-to-peer system, or another applicable distributed computing architecture.

The following drawings from FIG. 2 to FIG. 8 illustrate some example embodiments. Note that the drawings from FIG. 2 to FIG. 8 show some specific example embodiments, but besides these, also various notifications and statuses related to the at least one drone 160 may be shown on the head-mounted display 112.

In the drawings from FIG. 2 to FIG. 8, the user 120 is standing on the ground, and the drone 160 is flying in the air. However, the embodiments are also applicable to other kind of environments, such as flying the drone 160 in an underground cave, inside a man-made structure (such as a building or a tunnel), or even in such use cases where the drone 160 is flying below the user 120. In such a use case, the user 120 may be standing on a high platform (such as a skyscraper or a mountain), and the drone 160 may be flying below (such as above the streets or in a valley). The embodiments may also be applied to operating the drone 160 underwater, and the user 120 may be on the land or on a vessel, for example, while the drone 160 is underwater in a river, lake, sea, water-filled mine or tunnel, etc. The embodiments may also be applied to a drone 160 operating on the ground level.

Figure 2A:
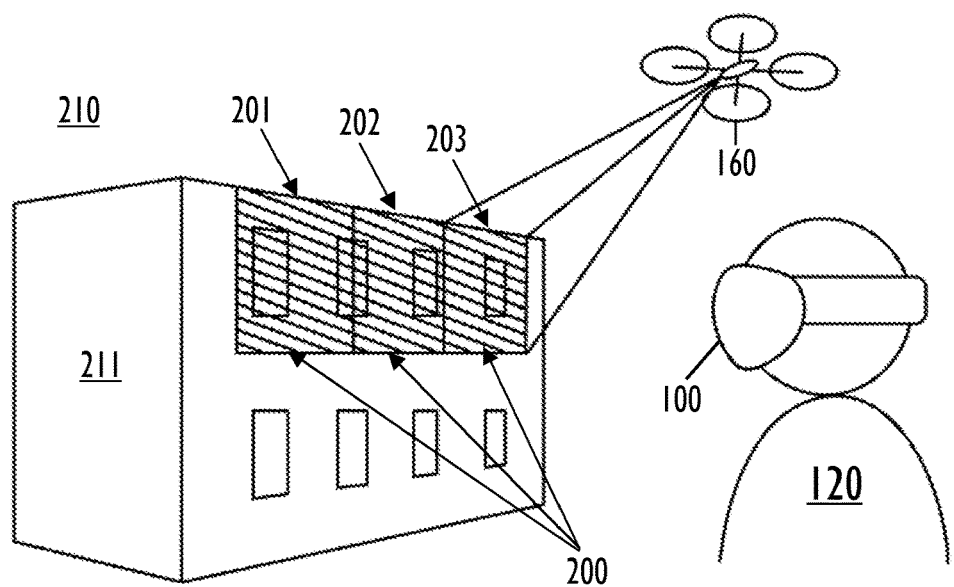

FIG. 2A illustrates an example embodiment, wherein the apparatus 100 is caused to superimpose, on the head-mounted display 112, a visualization 200 indicating one or more areas 201, 202, 203 covered or filmed by the at least one camera of the at least one drone 160, wherein the visualization 200 is superimposed on the one or more areas 201, 202, 203 in the real-world environment 210. For example, the visualization 200 may be superimposed on a building 211 in the real-world environment 210, such that the visualization 200 indicates the one or more areas 201, 202, 203 of the building 211 covered or filmed by the at least one camera of the at least one drone 160.

The data associated with the at least one drone 160 may be integrated into a geographically accurate model (digital twin) of the real-world environment 210. This is achieved by mapping the three-dimensional location of the at least one drone 160 onto a coordinate system that aligns with the digital twin of the actual real-world environment 210. Consequently, the visualization 200 can be precisely anchored to the one or more areas 201, 202, 203 within this digital twin. This anchoring remains stable even if the user 120 changes their viewpoint by moving or turning their head. In such cases, the visualization 200 continues to overlay the one or more areas 201, 202, 203 accurately, providing a consistent spatial reference as the user 120 examines other parts of the real-world environment 210.

In other words, the visualization 200 may be anchored to a digital twin of the real-world environment 210 (e.g., to the virtual surface of a digital twin model of the building 211), such that the visualization 200 remains fixed to the one or more areas 201, 202, 203, if the user 120 moves or turns their head to look at other areas of the real-world environment 210. For example, if the user 120 moves to a new position in the real-world environment 210, then the visualization 200 may still be shown in the same place on the one or more areas 201, 202, 203, but from a different perspective (i.e., from the new position of the user 120).

The real-world environment 210 refers to the physical space or surroundings, in which the user 120 and the at least one drone 160 exist, as opposed to simulated, virtual, or augmented environments. The real-world environment 210 may encompass natural landscapes, built structures, and/or other tangible elements that one can perceive through sensory experiences such as sight, touch, smell, and hearing. The real-world environment 210 is subject to natural laws and phenomena, including but not limited to, gravity, light, and time. Within the context of technologies like AR, VR or MR, the real-world environment 210 serves as the baseline or canvas upon which digital elements may be overlaid or integrated. It should be noted that the natural laws and phenomena may also be simulated in a digital twin of the real-world environment 210. For example, the lighting effects in the digital twin may change according to gravity, wind, and/or time.

Figure 2B:
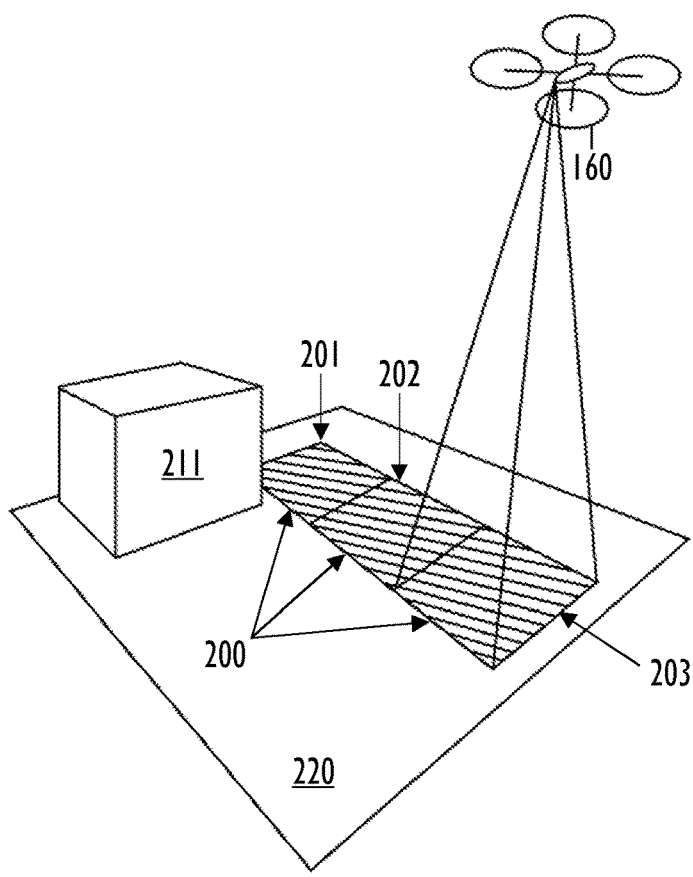

FIG. 2B illustrates an example embodiment, wherein the apparatus 100 is caused to superimpose, on the head-mounted display 112, a visualization 200 indicating one or more areas 201, 202, 203 covered or filmed by the at least one camera of the at least one drone 160, wherein the visualization 200 is superimposed on a virtual map 220 of the real-world environment 210.

In FIG. 2B, the virtual map 220 is shown from the perspective of the user 120 as seen on the head-mounted display 112. The virtual map 220 is a digital or computational representation that models or mimics the real-world environment 210. The virtual map 220 may be two-dimensional or three-dimensional, and it may include various layers of information such as one or more buildings 211, roadways, landmarks, and other geographical or contextual elements. The virtual map 220 may be generated and rendered in real-time, allowing it to be synchronized with the movements and viewpoint of the user 120. In contrast to FIG. 2A, the virtual map 220 is not an overlay that aligns with the real-world environment 210 in terms of scale and user viewpoint. Instead, the virtual map 220 serves as a distinct representation of the real-world environment 210, and the virtual map 220 is displayed with its own independent scale, position and perspective.

The apparatus 100 may receive data associated with the at least one drone 160, wherein the data at least indicates the one or more areas 201, 202, 203 covered or filmed by the at least one camera of the at least one drone 160 in the real-world environment 210. For example, the received data may comprise at least: a location of the at least one drone 160 in the real-world environment 210, a direction of the at least one drone 160, an orientation of the at least one camera, and a frustum of the at least one camera. The data may comprise current and/or historical information.

In FIG. 2A and FIG. 2B, the area 203 may depict an area that is currently being covered or filmed by the at least one camera of the at least one drone 160 in real-time, whereas the areas 201 and 202 may depict areas that have been previously covered or filmed by the at least one camera of the at least one drone 160 in the past. In other words, the one or more areas 201, 202, 203 indicated by the visualization 200 may comprise areas that are currently being covered by the at least one camera, and/or areas that have been previously covered by the at least one camera.

The example embodiments of FIG. 2A and FIG. 2B may assist the user 120 to understand which part of, for example, an inspected building 211 has already been photographed or recorded on video by the at least one drone 160. Based on the real-world location of the at least one drone 160, direction of the at least one drone 160, and the angles of the camera gimbal and the known frustum of the camera, the visualization 200 of the one or more covered areas 201, 202, 203 may be projected on the surface of the digital twin model of the building 211 to be visible on the head-mounted display 112. Also, the overlap of recorded images or video can be visualized to aid in fully covering (virtually "painting") the desired building 211 or ground area, without gaps, by using manual or automatic control of the at least one drone 160.

Conventionally, these photogrammetry inspection missions may be done with complex, difficult-to-create waypoint missions of even hundreds of waypoints, and still, these might leave gaps in the required data, which is only visible after processing of the photos and/or videos. Thus, the example embodiments shown in FIG. 2A and FIG. 2B aim to allow easy manual or automatic flights, using the drone as a "virtual spray-paint can" to easily cover the desired surfaces of the inspected building 211 or other infrastructure or ground area.

This can also be done from the inside out, when the drone 160 is inspecting the inside of a structure such as a refinery tank (i.e., picturing the inside of the refinery tank). In this case, the visualization 200 can be shown or painted on the outside surface of the refinery tank to better understand which parts of the inside have already been covered by the drone camera. With legacy techniques, it is almost guesswork where to restart imaging, when the drone 160 has to come out of the refinery tank and go back in (e.g., after a battery swap).

Furthermore, in search-and-rescue missions, the example embodiments of FIG. 2A and FIG. 2B can be used to show which areas 201, 202, 203 and/or surfaces have already been seen by the drone camera, so that the user 120 can focus on searching the other areas that have not yet been seen by the drone camera.

In FIG. 2A and FIG. 2B, the visualization 200 may comprise, for example, a color overlay, such that distinctive color schemes can be superimposed over the one or more areas 201, 202, 203 to distinguish them from their surroundings.

As another example, the visualization 200 may comprise pattern overlays, such that specific textures or patterns (e.g., stripes, or dots) can be overlaid onto the one or more areas 201, 202, 203 to distinguish them from the surrounding environment. The patterns may be overlaid in such a way that the density of these patterns depends on the camera distance and the duration that a given area or location has been on the camera view, thus helping the user 120 understand how well each area or location has been recorded.

As another example, the visualization 200 may comprise wireframe boundaries, such that two-dimensional or three-dimensional wireframe models can outline or enclose the one or more areas 201, 202, 203, enabling easy identification.

As another example, the visualization 200 may comprise one or more text labels or symbols anchored to the one or more areas 201, 202, 203, providing additional context or instructions.

As another example, the visualization 200 may comprise one or more three-dimensional holographic indicators, such that three-dimensional holographic arrows or markers can be placed to highlight the one or more areas 201, 202, 203.

As another example, the visualization 200 may comprise particle effects, such that virtual particles like glowing orbs or sparkles can be employed to mark the one or more areas 201, 202, 203 dynamically, giving a sense of motion to static scenes.

As another example, the visualization 200 may comprise volumetric fog or light, such that a virtual light or fog can be added to the one or more areas 201, 202, 203 to distinguish them from the surrounding environment.

Figure 3:
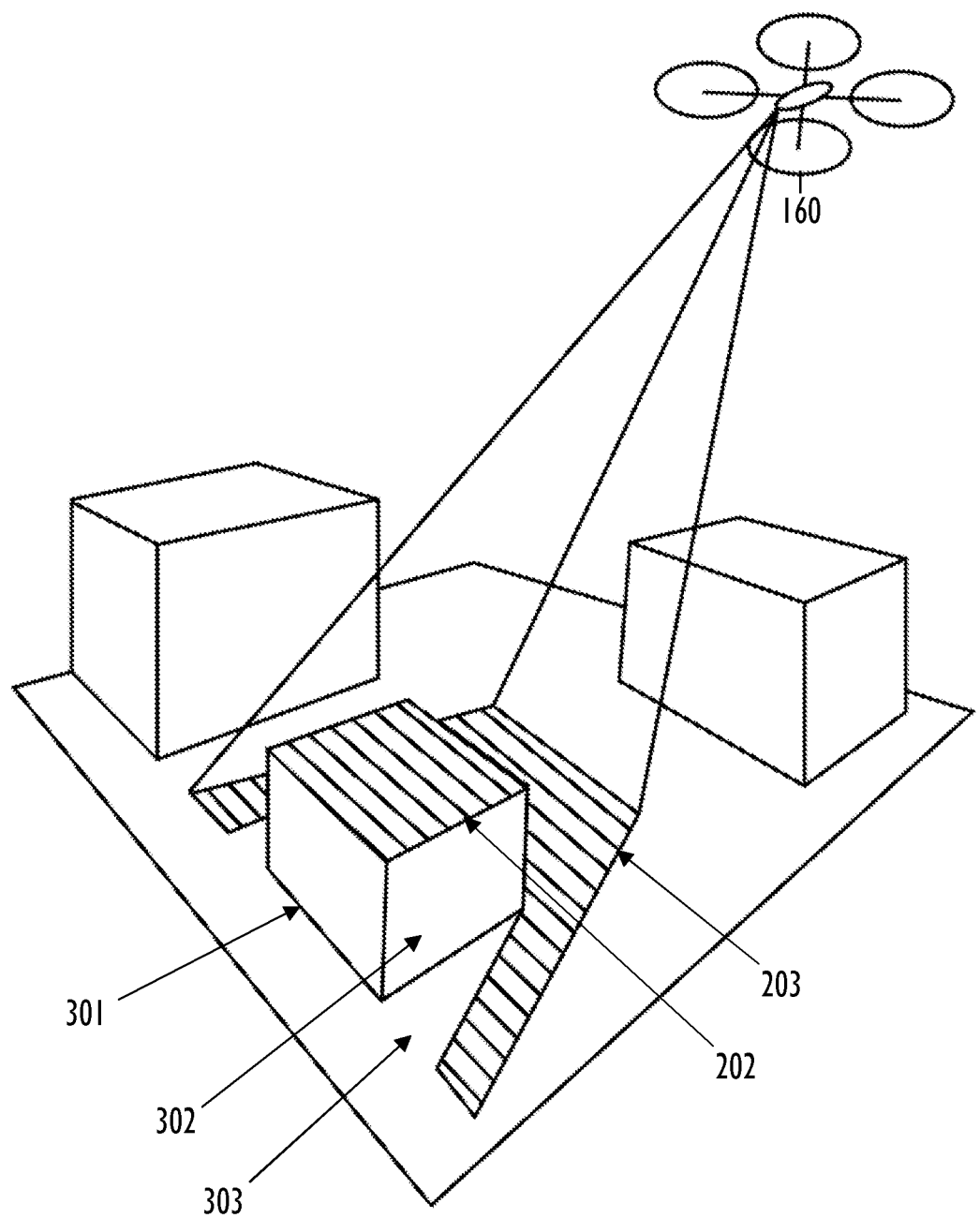

FIG. 3 illustrates an example embodiment, wherein the apparatus 100 is caused to superimpose, on the head-mounted display 112, a visualization indicating one or more non-covered areas 301, 302 that have not been covered or filmed by the at least one camera of the at least one drone 160, wherein the visualization indicating the one or more non-covered areas 301, 302 is superimposed on at least one of: the real-world environment 210 or the virtual map 220.

In FIG. 3, the visualization indicating the one or more non-covered areas 301, 302, 303 is depicted by the white areas outside of the areas 202, 203 covered by the at least one camera of the at least one drone 160. The visualization indicating the one or more non-covered areas 301, 302, 303 may be similar to the visualization 200 of the one or more areas 201, 202, 203 covered by the at least one camera, but in a different color, for example. As an example, a virtual light can be added to the one or more areas 201, 202, 203 covered by the at least one camera, and a virtual fog can be added to the one or more non-covered areas 301, 302, 303 to distinguish the covered and non-covered areas from each other.

The visualization indicating the one or more non-covered areas 301, 302, 303 may be anchored to a digital twin of the real-world environment 210, such that the visualization remains fixed to the one or more non-covered areas 301, 302, 303, if the user 120 moves or turns their head to look at other areas of the real-world environment 210. For example, if the user 120 moves to a new position in the real-world environment 210, then the visualization may still be shown in the same place on the one or more non-covered areas 301, 302, 303, but from a different perspective (i.e., from the new position of the user 120).

The apparatus 100 may be caused to determine the one or more non-covered areas 301, 302 based on the data received from the at least one drone 160 or the remote controller 150 or another entity. In other words, the apparatus 100 may calculate shadow areas, to which the drone's camera has not had a line of sight (e.g., some rock crevices, depressions, areas behind a hill or building, etc.).

Figure 4A:
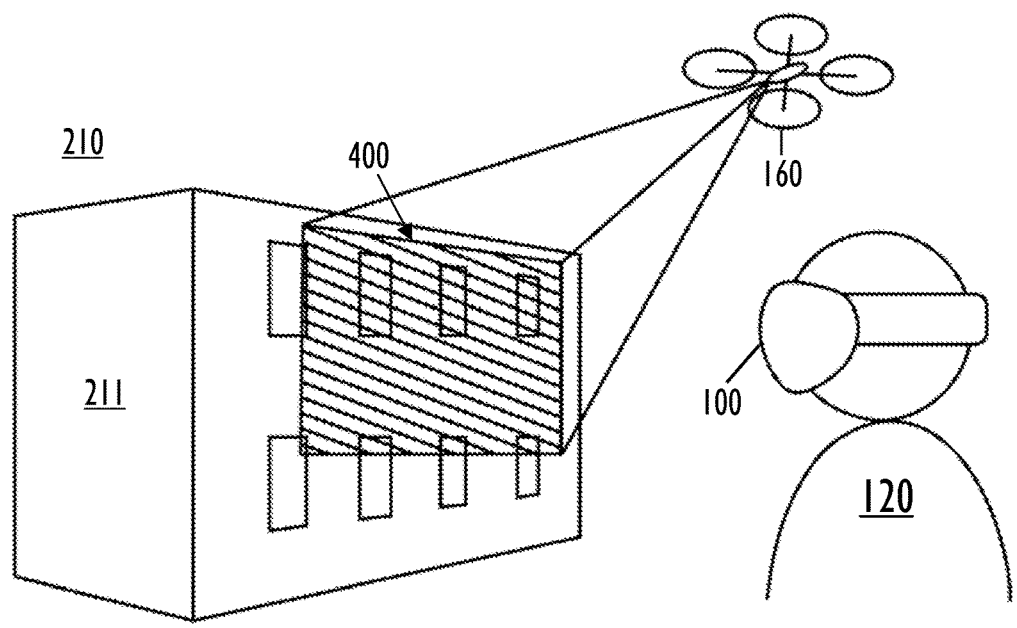

FIG. 4A illustrates an example embodiment, wherein the apparatus 100 is caused to superimpose, on the head-mounted display 112, a visualization 400 such as a video feed or a picture or a thermal map of one or more areas covered or filmed by the at least one camera of the at least one drone 160, wherein the video feed or the picture or the thermal map is superimposed on the one or more areas in the real-world environment 210.

The frustum of the drone camera may be projected onto a digital twin surface of the real-world environment 210, such as on a building 211 or ground area. For example, by using the thermal camera of the drone 160, thermal leaks can be observed exactly on their correct positions on the building 211, making it easier to understand what causes them.

In other words, the visualization 400 may be anchored to a digital twin of the real-world environment 210 (e.g., to the virtual surface of a digital twin model of the building 211), such that the visualization 400 remains fixed to the one or more areas, if the user 120 moves or turns their head to look at other areas of the real-world environment 210. For example, if the user 120 moves to a new position in the real-world environment 210, then the visualization 400 may still be shown in the same place on the one or more areas, but from a different perspective (i.e., from the new position of the user 120).

This can also be done from the inside out, when the drone 160 is inspecting the inside of a structure such as a refinery tank (i.e., picturing the inside of the refinery tank). This imagery from the inside can be shown or painted on the outside surface of the refinery tank to: a) understand how the inside features link with the outside features, and b) to better understand which parts of the inside are already covered by the drone camera. With legacy techniques, it is almost guesswork where to restart imaging, when the drone 160 has to come out of the refinery tank and go back in (e.g., after a battery swap).

Figure 4B:
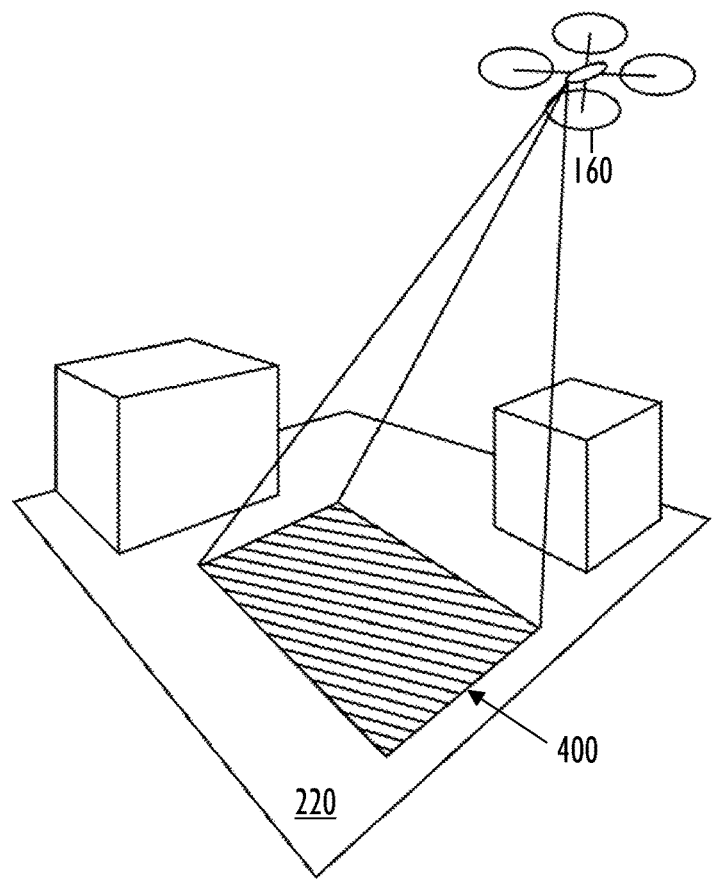

FIG. 4B illustrates an example embodiment, wherein the apparatus 100 is caused to superimpose, on the head-mounted display 112, a visualization 400 such as a video feed or a picture or a thermal map of one or more areas covered or filmed by the at least one camera of the at least one drone 160, wherein the video feed or the picture or the thermal map is superimposed on the virtual map 220. In FIG. 4B, the virtual map 220 is shown from the perspective of the user 120 as seen on the head-mounted display 112. The virtual map 220 may be two-dimensional or three-dimensional.

The projection 400 on the virtual map 220 (as shown in FIG. 4B) may be helpful, for example, in search-and-rescue missions or police searches of people in the streets, since the user 120 can see the live video feed projection directly on the virtual map 220. The user 120 may also point a location of interest on the video feed to display its map coordinates, address, and/or, for example, the location on the vertical surface of a building. In a drone video shot in a low angle close to the horizon, vertically neighboring pixels of the video may also represent significantly different locations, making it difficult to understand what the different parts of the video actually show. The same can happen also horizontally, especially when there are buildings partially covering the video. Projecting each video pixel on the three-dimensional digital twin thus helps to understand the contents of the video.

Figure 5A:
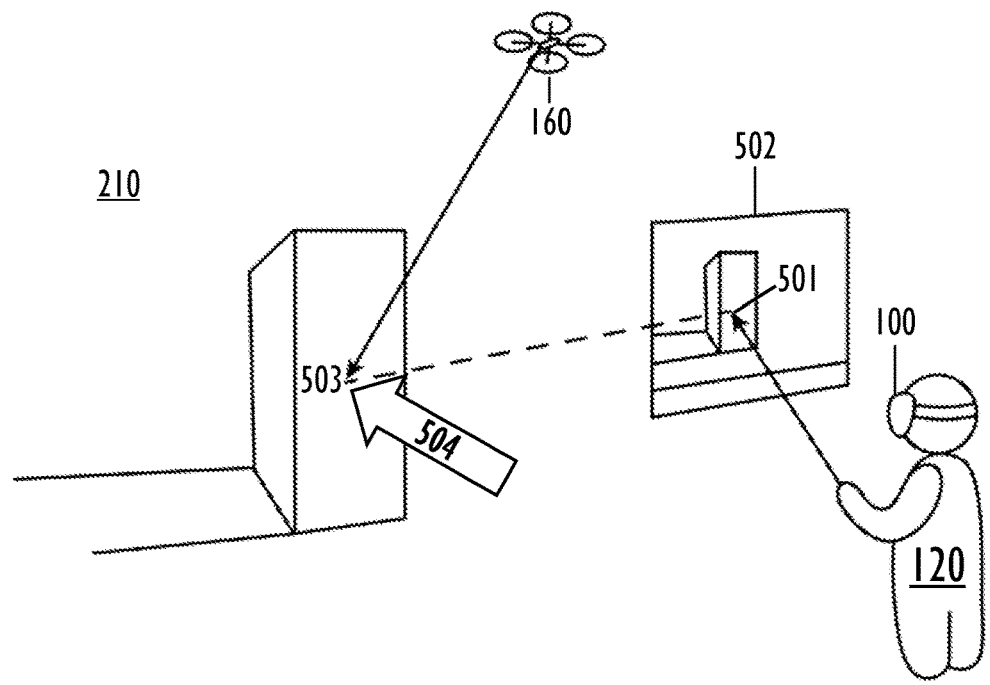

FIG. 5A illustrates an example embodiment, wherein the apparatus 100 is caused to detect a point of interest 501 (e.g., a building or hill) in a video feed 502 or a picture 502 from the at least one camera of the at least one drone 160. For example, the apparatus 100 may be caused to superimpose the video feed 502 or picture 502 on the head-mounted display 112, and detect a user gesture from the user 120 that indicates the point of interest 501 in the superimposed video feed 502 or picture 502. For example, the user gesture may mean that the user 120 points their hand or finger to the point of interest 501 in the video feed 502 or picture 502.

The apparatus 100 may further be caused to determine a location 503 of the point of interest 501 in the real-world environment 210 based on digital twin data of the real-world environment 210; and superimpose, on the head-mounted display 112, an indication 504 indicating the location 503 of the point of interest 501, wherein the indication 504 is superimposed on the real-world environment 210.

Figure 5B:
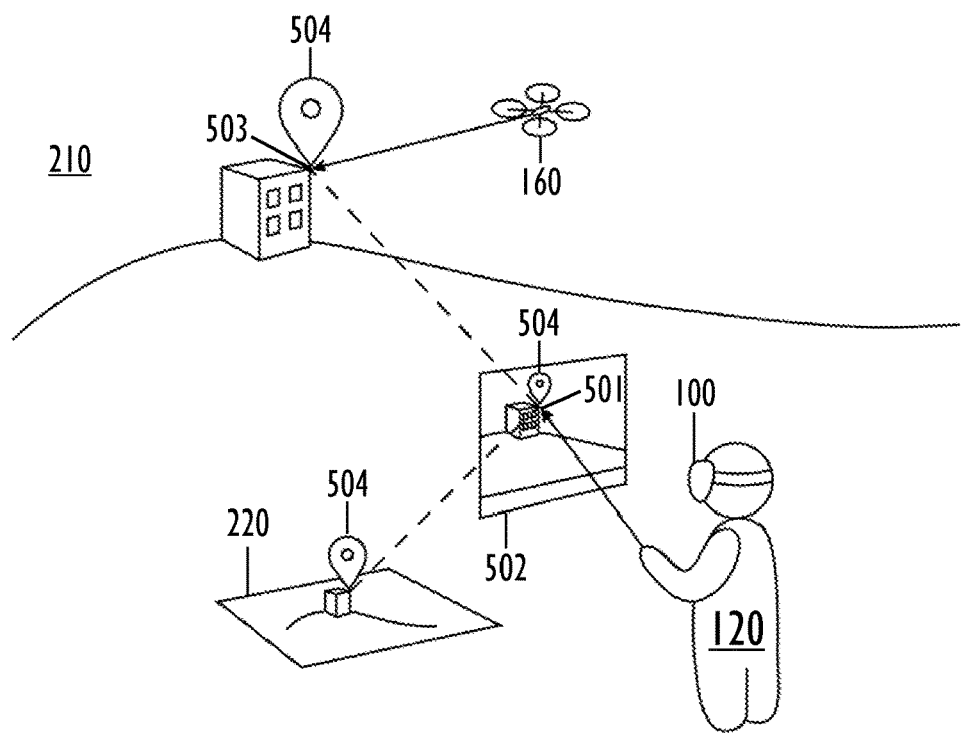

FIG. 5B illustrates an example embodiment, wherein the apparatus 100 is caused to detect a point of interest 501 in a video feed 502 or a picture 502 from the at least one camera of the at least one drone 160. For example, the apparatus 100 may be caused to superimpose the video feed 502 or picture 502 on the head-mounted display 112, and detect a user gesture from the user 120 that indicates the point of interest 501 in the superimposed video feed 502 or picture 502. For example, the user gesture may mean that the user 120 points their hand or finger to the point of interest 501 in the video feed 502 or picture 502.

The apparatus 100 may further be caused to determine a location 503 of the point of interest 501 in the real-world environment 210 based on digital twin data of the real-world environment 210; and superimpose, on the head-mounted display 112, an indication 504 indicating the location 503 of the point of interest 501, wherein the indication 504 is superimposed on at least one of: the real-world environment 210, the virtual map 220, or the video feed 502 or picture 502.

In the example embodiments of FIG. 5A and FIG. 5B, the indication 504 may be anchored to a digital twin of the real-world environment 210, such that the indication 504 remains fixed to the location 503 of the point of interest 501, if the user 120 moves or turns their head to look at other areas of the real-world environment 210. For example, if the user 120 moves to a new position in the real-world environment 210, then the indication 504 may still be shown in the same location 503 of the point of interest 501, but from a different perspective (i.e., from the new position of the user 120).

Some advanced drone cameras may be equipped with an integrated laser range finder that can show the distance to the (usually) center-point of the drone video feed, i.e., how far the drone is to any object along the camera line-of-sight. However, in the example embodiments of FIG. 5A and FIG. 5B, the world-scale digital twin data of the ground level, buildings etc. can be used to find and mark a location at any point of the video feed 502 or picture 502, thus providing "virtual laser range finder" capabilities to any drone equipped with a camera (i.e., without needing physical laser range finder equipment).

In one example embodiment, the distance to the location 503 of the point of interest 501 may be displayed to the user 120. In this case, the apparatus 100 may be caused to: determine a location 503 of a point of interest 501 in the real-world environment 210 based on digital twin data of the real-world environment 210; determine a distance from the at least one drone 160 or from the user 120 to the location 503 of the point of interest 501; and superimpose, on the head-mounted display 112, a distance metric that indicates the distance from the at least one drone 160 or from the user 120 to the location 503 of the point of interest. For determining the distance, the location of the user 120 (i.e., the location of the apparatus 100) and/or the location of the at least one drone 160 in the real-world environment 210 may be known by the apparatus 100, for example, based on global positioning system (GPS) tracking.

The example embodiments of FIG. 5A and FIG. 5B may also be inverted to display any virtually marked (e.g., with an indication 504 such as a world marker or mission waypoint) location 503 in the real-world environment 210 rendered into the drone video footage 502 on the head-mounted display 112, and/or on the display of the remote controller 150.

In one example embodiment, the apparatus 100 may be caused to detect a point of interest in the real-world environment 210. For example, the apparatus 100 may detect a user gesture from the user 120 that indicates the point of interest in the real-world environment 210. For example, the user gesture may mean that the user 120 points their hand or finger to the point of interest in the real-world environment 210.

The apparatus 100 may further be caused to determine a location of the point of interest in the real-world environment 210 based on digital twin data of the real-world environment 210. The apparatus may further be caused to superimpose, on the head-mounted display 112, an indication indicating the location of the point of interest, wherein the indication is superimposed on at least one of: the real-world environment 210, the virtual map 220, or a video feed 502 or a picture 502 from the at least one camera of the at least one drone 160 (the video feed 502 or the picture 502 may be superimposed on the head-mounted display 112).

This would be beneficial, if, for example a command center would want to guide the user 120 to fly the drone 160 to the exact location 503 of the point of interest 501. In one example embodiment, this location 503 could be seen both in the real-world location directly through the head-mounted display 112 (e.g., as shown in FIG. 5A), and also in the video feed 502 of the drone 160 (e.g., as shown in FIG. 5B), when the heading of the drone 160 is correctly towards the point of interest 501, thus making it easier to understand the direction needed (e.g., when very far away from the point of interest 501. This idea may also be extended by displaying the underlying mesh of the digital twin of the real-world environment projected on top of the drone video footage 502.

In an example embodiment, the apparatus 100 may be caused to detect a point of interest on the virtual map 220. For example, the apparatus 100 may detect a user gesture from the user 120 that indicates the point of interest on the virtual map 220. For example, the user gesture may mean that the user 120 points their hand or finger to the point of interest on the virtual map 220.

The apparatus 100 may further be caused to determine a location of the point of interest in the real-world environment 210 based on digital twin data of the real-world environment 210. The apparatus may further be caused to superimpose, on the head-mounted display 112, an indication indicating the location of the point of interest, wherein the indication is superimposed on at least one of: the real-world environment 210, the virtual map 220, or a video feed 502 or a picture 502 from the at least one camera of the at least one drone 160 (the video feed 502 or the picture 502 may be superimposed on the head-mounted display 112).

As an example, the indication 504 of FIG. 5A or FIG. 5B may comprise a world marker. A world marker refers to a virtual marker that is anchored to a specific geographical location within the real-world environment 210. This world location-based virtual marker serves as a fixed point of reference in the virtual overlay, facilitating the accurate positioning and orientation of digital elements in correlation with their real-world counterparts. For example, a world marker may be set on the geographical location 503 of the point of interest 501 and/or the geographical location of the at least one drone 160.

As another example, the indication 504 of FIG. 5A or FIG. 5B may comprise a two-dimensional or three-dimensional arrow that may be overlaid to point directly at the location 503 of the point of interest 501.

As another example, the indication 504 may comprise one or more anchored labels, such that a text label with or without accompanying icons can be anchored to the location 503 of the point of interest 501 to provide additional information like the name of the location 503 or the point of interest 501.

As another example, the indication 504 may comprise a numeric or alphabetic code, such that a number or letter can be superimposed near or on the location 503 of the point of interest 501 for quick reference. This may be especially useful in scenarios involving multiple points of interest.

As another example, the indication 504 may comprise a three-dimensional holographic marker (e.g., symbol or shape).

As another example, the indication 504 may comprise a spotlight effect, such that a virtual spotlight or beam of light can be projected onto the location 503 of the point of interest 501.

As another example, the indication 504 may comprise a glowing halo or aura, such that a circular glow or pulsating halo can be placed around the location 503 of the point of interest 501 to indicate its significance.

As another example, the indication 504 may comprise a floating badge or pin, such that a virtual badge, similar to map pins, could float above the location 503 of the point of interest 501 and might include additional interactive elements like clickable information buttons.

As another example, the indication 504 may comprise an interactive bubble, such that a semi-transparent sphere or bubble could encompass the location 503 of the point of interest 501, offering an interactive interface upon touch or gaze activation for more details.

As another example, the indication 504 may comprise a pathway indicator, such that a virtual path, like dotted lines or footsteps, can be overlaid on the ground to guide the user 120 to the location 503 of the point of interest 501.

As another example, the indication 504 may comprise a bounding box, such that a two-dimensional or three-dimensional box can frame the location 503 of the point of interest 501 to clearly delineate its boundaries or area.

As another example, the indication 504 may comprise dynamic graphics, such as animated indicators like spinning rings or orbiting particles around the location 503 of the point of interest 501.

In addition to or as an alternative to the visual indicator 504, spatial audio cues or vibration or haptic feedback can be used to guide the user 120 towards the location 503 of the point of interest 501.

Figure 6A:
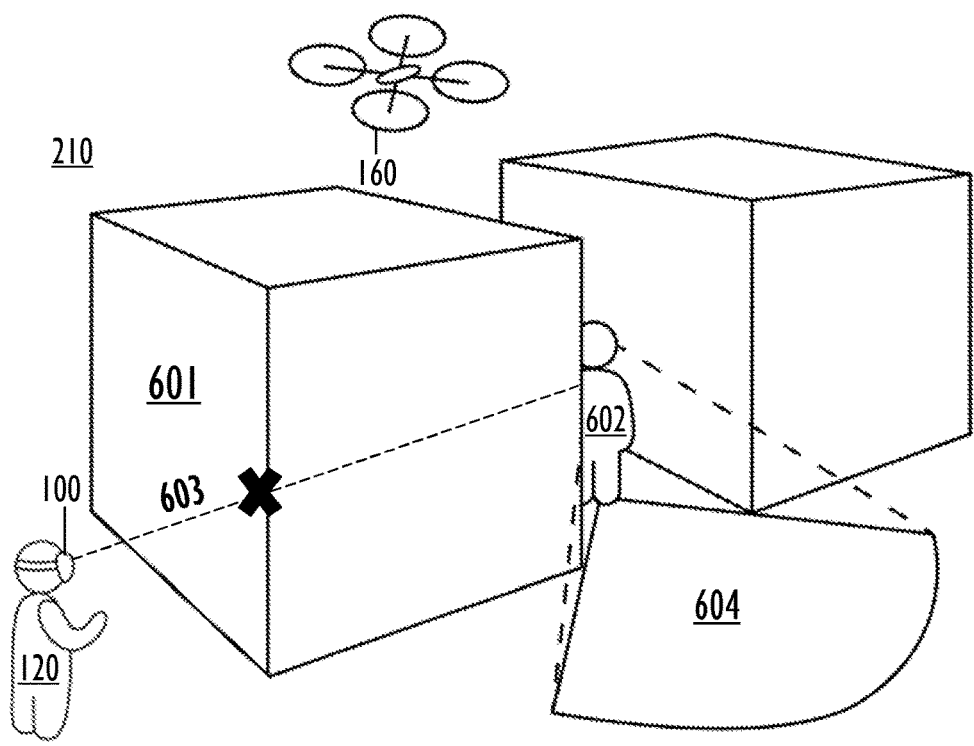

FIG. 6A illustrates an example embodiment, wherein the apparatus 100 is caused to detect one or more obstacles 601 blocking a line of sight 603 between the user 120 and a target 602. The target 602 may be a person or an object. The one or more obstacles 601 may comprise, for example, a building or another object or a geographical barrier (e.g., a hill).

The apparatus 100 is caused to determine a two-dimensional or three-dimensional field of view 604 from the target 602 based on a location of the target 602 in relation to the one or more obstacles 601 according to digital twin data of the real-world environment 210. The apparatus 100 is further caused to superimpose, on the head-mounted display 112, the two-dimensional or three-dimensional field of view 604 from the target 602, wherein the two-dimensional or three-dimensional field of view 604 is superimposed on the real-world environment 210. The location of the target 602 may be received from the at least one drone 160 or from another entity (e.g., from a command center).

In other words, when the drone 160 detects a target 602 that cannot be viewed directly by the user 120 due to an obstacle such as a building 601, the position of the target 602 behind the building 601 and the visual line of sight possibilities of the target 602 can be shown on the head-mounted display 112. The field of view 604 may be calculated in three dimensions, and displayed in either two dimensions or three dimensions. Depending on the point of view (angle) and direction of the user 120, the two-dimensional field of view may provide a simplified shape that is easier to understand by the user 120 (e.g., when displayed on the ground or on the map virtual map 220).

Figure 6B:
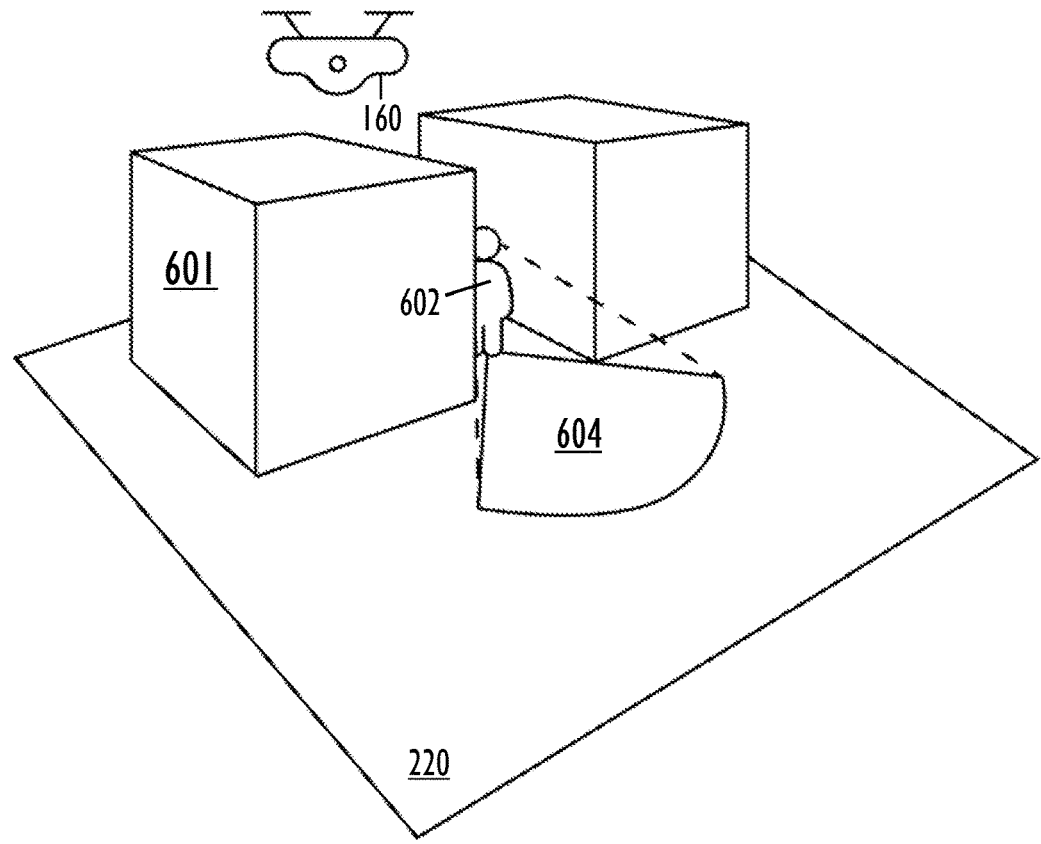

FIG. 6B illustrates an example embodiment, wherein the apparatus 100 is caused to detect one or more obstacles 601 (e.g., a building or any other object) blocking a line of sight between the user 120 and a target 602. The target 602 may be a person or an object.

The apparatus 100 is caused to determine a two-dimensional or three-dimensional field of view 604 from the target 602 based on a location of the target 602 in relation to the one or more obstacles 601 according to digital twin data of the real-world environment 210.

The apparatus 100 is further caused to superimpose, on the head-mounted display 112, the two-dimensional or three-dimensional field of view 604 from the target 602, wherein the two-dimensional or three-dimensional field of view 604 is superimposed on the virtual map 220. In FIG. 6B, the virtual map 220 is shown from the perspective of the user 120 as seen on the head-mounted display 112. The virtual map 220 may be two-dimensional or three-dimensional.

Figure 6C:
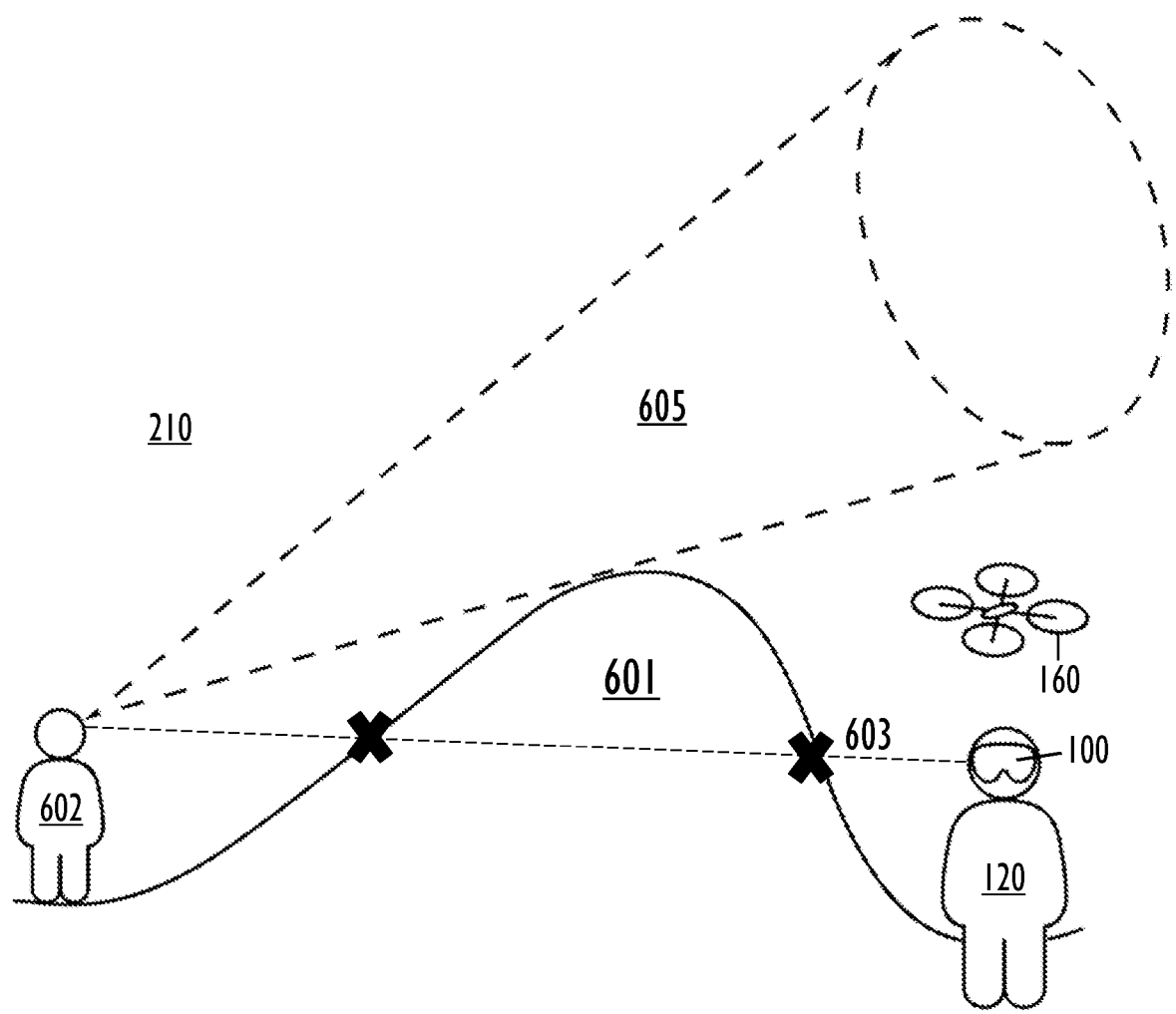

FIG. 6C illustrates an example embodiment, wherein the apparatus 100 is caused to detect one or more obstacles 601 (e.g., a hill) blocking a line of sight between the user 120 and a target 602.

The apparatus 100 is caused to determine a three-dimensional field of view 605 from the target 602 based on a location of the target 602 in relation to the one or more obstacles 601 according to digital twin data of the real-world environment 210.

The apparatus 100 is further caused to superimpose, on the head-mounted display 112, the three-dimensional field of view 605 from the target 602, wherein the three-dimensional field of view 605 is superimposed on at least one of: the real-world environment 210 or the virtual map 220. The dimensions of the three-dimensional field of view 605 in different directions may be calculated based on a three-dimensional digital twin model of the real-world environment 210.

In other words, when the target 602 (e.g., a dangerous person) is known to be behind an obstacle 601, the three-dimensional volumes of visual lines-of-sight can be calculated continuously, so that the drone 160 can be flown in a safe area, or that the user 120 can move in a safe area.

In FIG. 6A, FIG. 6B and FIG. 6C, the superimposed field of view 604 or 605 may be anchored to a digital twin of the real-world environment 210, such that the superimposed field of view 604 or 605 remains fixed to the actual geospatial coordinates of the field of view of the target 602, if the user 120 moves or turns their head to look at other areas of the real-world environment 210. For example, if the user 120 moves to a new position in the real-world environment 210, then the superimposed field of view 604 or 605 may still be shown in the same geospatial coordinates as previously, but from a different perspective (i.e., from the new position of the user 120).

Figure 7A:
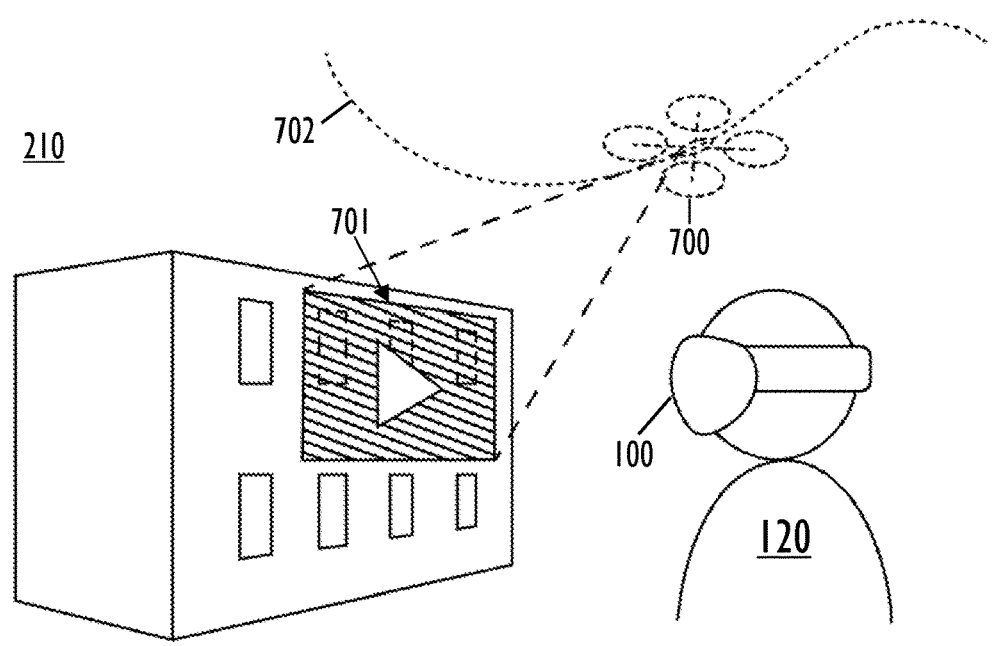

FIG. 7A illustrates an example embodiment, wherein the apparatus 100 is caused to superimpose, on the head-mounted display 112, a playback of a recorded mission of the at least one drone 160 by using a virtual or digital representation 700 of the at least one drone 160, wherein the playback of the recorded mission is superimposed on the real-world environment 210.

The playback of the recorded mission refers to the replaying or visualizing of a previously executed operation or mission of the at least one drone 160. In this context, the recorded mission may include the data captured during the drone's task or journey, which may be airborne, ground-based, or submersible. For example, in case of an aerial drone 160, the mission may refer to the flight of the drone 160. The virtual representation 700 refers to a simulated or digital model of the at least one drone 160 that may be displayed on the head-mounted display 112. When the recorded mission is played back, the virtual or digital representation 700 mimics the actions and path of the real drone 160 as it occurred during the original mission. This allows for the review and analysis of the drone's performance, behavior, and path following the execution of its task.

Alternatively, or additionally, the apparatus 100 may be caused to superimpose, on the head-mounted display 112, a playback of a recorded video feed 701 from the at least one camera of the at least one drone 160, wherein the playback of the recorded video feed 701 is superimposed on the real-world environment 210 on a corresponding area originally covered by the recorded video feed 701. The playback of the recorded video feed refers to the act of viewing or displaying a video that has been previously captured and stored by the at least one drone 160, allowing for the review of the content at a later time. The replayed video footage is overlaid in such a way that it aligns spatially with the actual physical environment where the video footage was originally captured.

Alternatively, or additionally, the apparatus 100 may be caused to superimpose, on the head-mounted display 112, a route 702 traveled by the at least one drone 160, wherein the route 702 is superimposed on the real-world environment 210. For example, in case of an aerial drone 160, the route may refer to the flight path of the drone 160.

The virtual representation 700, the playback of the recorded video feed 701, and the route 702 may be anchored to a digital twin of the real-world environment 210, such that they remain in a fixed position, if the user 120 moves or turns their head to look at other areas of the real-world environment 210. For example, if the user 120 moves to a new position in the real-world environment 210, then they may still be shown in the same place, but from a different perspective (i.e., from the new position of the user 120).

Figure 7B:
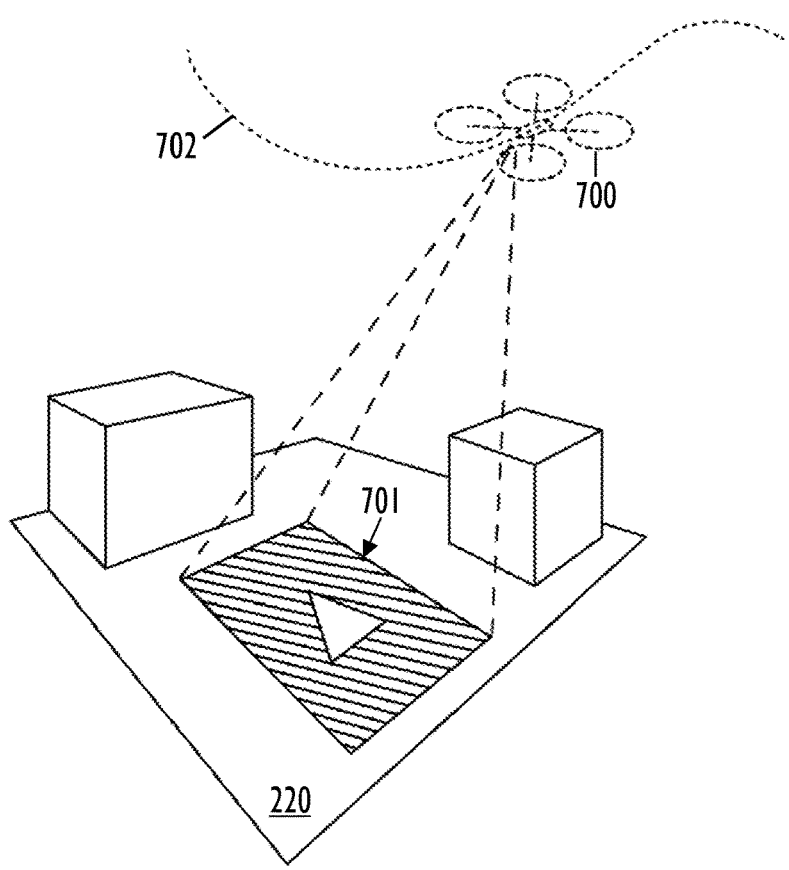

FIG. 7B illustrates an example embodiment, wherein the apparatus 100 is caused to superimpose, on the head-mounted display 112, a playback of a recorded mission of the at least one drone 160 by using a virtual representation 700 of the at least one drone 160, wherein the playback of the recorded mission is superimposed on the virtual map 220. In FIG. 7B, the virtual map 220 is shown from the perspective of the user 120 as seen on the head-mounted display 112. The virtual map 220 may be two-dimensional or three-dimensional.

Alternatively, or additionally, the apparatus 100 may be caused to superimpose, on the head-mounted display 112, a playback of a recorded video feed 701 from the at least one camera of the at least one drone 160, wherein the playback of the recorded video feed is superimposed on the virtual map 220 on a corresponding area covered by the recorded video feed 701.

Alternatively, or additionally, the apparatus 100 may be caused to superimpose, on the head-mounted display 112, a route 702 traveled by the at least one drone 160, wherein the route 160 is superimposed on the virtual map 220.

In other words, the flight of the drone 160 and/or the captured video feed 701 may be recorded and played back as a three-dimensional flight displayed on the virtual map 220 (e.g., as shown in FIG. 7B), so that the flight and the video 701 can be seen from the outside perspective. The video 701 follows the drone camera frustrum in the three-dimensional space, and the projection depth can be adjusted. This can also be done in real-world scale, i.e., projected onto real terrain and buildings (e.g., as shown in FIG. 7A). Furthermore, the drone flight trail 702 can be displayed in a three-dimensional map 220 or in the real-world locations and scales, when the flight is under way, and played back afterwards.

Figure 8:
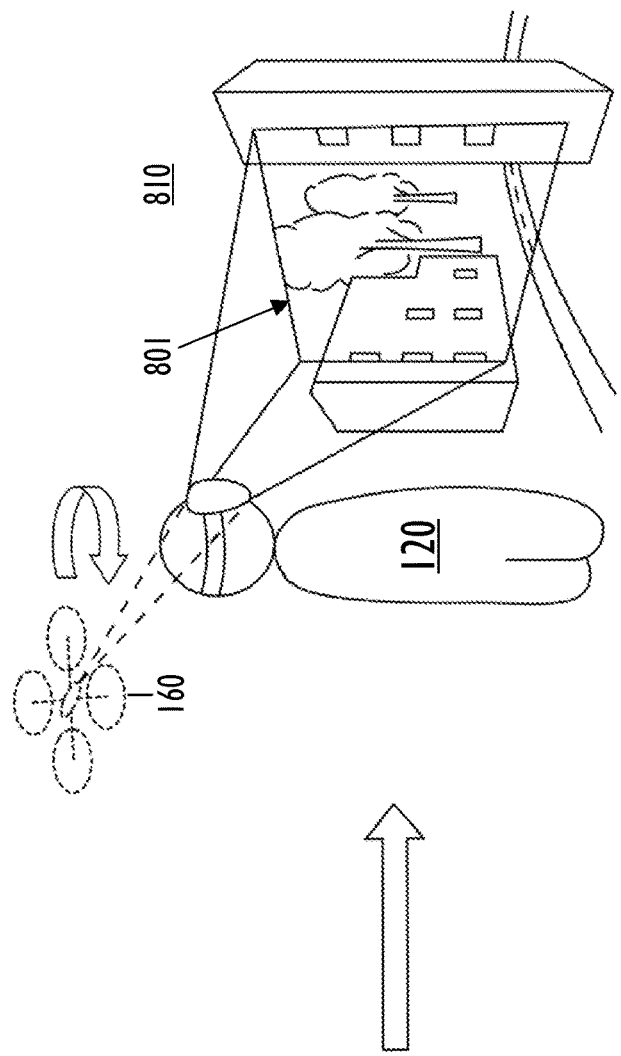
FIG. 8 illustrates an example embodiment.
Figure 8:
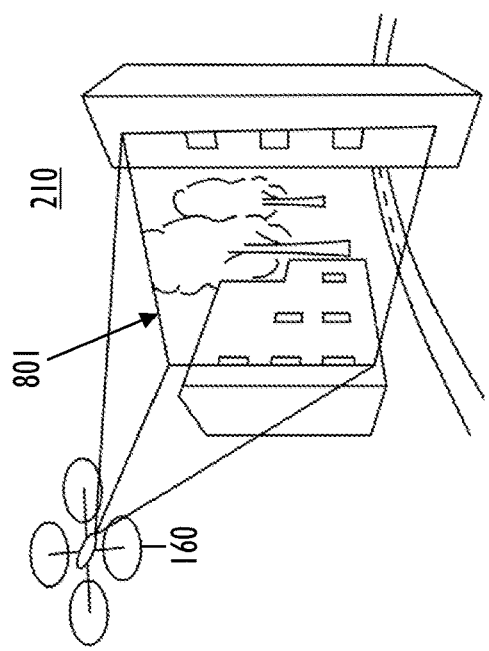

FIG. 8 illustrates an example embodiment, wherein the apparatus 100 is caused to superimpose, on the head-mounted display 112, a digital representation 810 of the real-world environment 210 based on the virtual map 220, such that a point of view of the user 120 relative to the digital representation 810 is positioned at a location of the at least one camera of the at least one drone 160. The digital representation 810 may be three-dimensional.

The apparatus 100 may further be caused to superimpose, on the head-mounted display 112, a video feed 801 of an area of the real-world environment 210 from the at least one camera of the at least one drone 160, wherein the video feed 801 is superimposed on a corresponding area of the digital representation 810 of the real-world environment 210, such that the video feed 801 remains fixed to the corresponding area of the digital representation 810 if the head of the user 120 is moving. In other words, the drone camera angle does not move, if the user 120 is moving his or her head.

For example, if the video feed 801 is displaying a building in the real-world environment 210, and the user 120 turns his or her head away from the video feed 801 to look at another building in the digital representation 810, then the user 120 may see a three-dimensional digital twin model of the other building (and not the video feed 801). It is also possible to combine the video feed 801 and the digital representation 810 (i.e., the three-dimensional models) such that simulated buildings or roads in the corresponding area viewed by the drone camera are highlighted on top of the video feed 801. It is also possible to superimpose or project video feeds from multiple drones on the corresponding areas of the digital representation 810 of the real-world environment 210, in which case the point of view of the user 120 relative to the digital representation 810 is positioned at a location of at least one camera of one of the drones.

In other words, FIG. 8 illustrates an extended first-person view (FPV), where the user's point of view is positioned at the location of the drone camera, and the drone video is visible on the camera image plane, i.e., a plane positioned on the camera frustum at an arbitrary distance from the camera, and scaled so that the plane fills exactly the camera field of view, and faces the camera. The camera image is thus positioned in such a way that the video content aligns with the virtual map 220, and the user 120 can still freely observe the environment composed of the virtual map 220 and the video feed 801 by turning their head away from the video view 801 and back. This allows the user 120 to view, for example, a satellite-imagery-based map and three-dimensional models of buildings around the live video view 801 of the drone camera. The three-dimensional models themselves may not have any surface textures, but the video-feed 801 from the drone can be used to project textures on the three-dimensional models (e.g., buildings) in the correct perspective.

FIG. 9 illustrates a flow chart according to an example embodiment of a method performed by the apparatus 100.

Referring to FIG. 9, in block 901, the apparatus 100 receives data associated with at least one drone 160, wherein the data at least indicates one or more areas 201, 202, 203 covered by at least one camera of the at least one drone 160 in a real-world environment 210.

The data may comprise at least: a location of the at least one drone 160 in the real-world environment 210, a direction of the at least one drone 160, an orientation of the at least one camera, and a frustum of the at least one camera.

The data may further comprise digital twin data of the real-world environment 210.

In block 902, the apparatus 100 may superimpose, on a head-mounted display 112, a visualization 200 indicating the one or more areas 201, 202, 203 covered by the at least one camera of the at least one drone 160, wherein the visualization 200 may be superimposed on at least one of: the one or more areas 201, 202, 203 in the real-world environment 210, or a virtual map 220 of the real-world environment 210.

Alternatively, or additionally, the apparatus 100 may superimpose, on the head-mounted display 112, a visualization 400 such as a video feed or a picture or a thermal map of the one or more areas from the at least one camera of the at least one drone 160, wherein the video feed or the picture or the thermal map is superimposed on at least one of: the one or more areas in the real-world environment 210, or the virtual map 220. The video feed or the picture or the thermal map may be included in the received data.

Alternatively, or additionally, the apparatus 100 may superimpose, on the head-mounted display 112, a playback of a recorded mission of the at least one drone 160 by using a virtual representation 700 of the at least one drone 160, wherein the playback of the recorded mission is superimposed on at least one of: the real-world environment 210 or the virtual map 220. The playback of the recorded mission may be superimposed based on the received data.

Alternatively, or additionally, the apparatus 100 may superimpose, on the head-mounted display 112, a playback of a recorded video feed 701 from the at least one camera of the at least one drone 160, wherein the playback of the recorded video feed 701 is superimposed on a corresponding area covered by the recorded video feed 701 on at least one of: the real-world environment 210 or the virtual map 220. The playback of the recorded video feed 701 may be superimposed based on the received data, wherein the recorded video feed may be included in the received data.

Alternatively, or additionally, the apparatus 100 may superimpose, on the head-mounted display 112, a route 702 traveled by the at least one drone 160, wherein the route 702 is superimposed on at least one of: the real-world environment 210 or the virtual map 220. The route 702 may be superimposed based on the received data.

Alternatively, or additionally, the apparatus 100 may superimpose, on the head-mounted display 112, a digital representation 810 of the real-world environment 210 based on the virtual map 220, such that a point of view of the user 120 relative to the digital representation 810 is positioned at a location of the at least one camera of the at least one drone 160 (e.g., based on the received data). The apparatus 100 may further superimpose, on the head-mounted display 112, a video feed 801 of an area of the real-world environment 210 from the at least one camera of the at least one drone 160, wherein the video feed 801 is superimposed on a corresponding area of the digital representation 810 of the real-world environment 210, such that the video feed 801 remains fixed to the corresponding area of the digital representation 810 if the head of the user 120 is moving. The video feed 801 may be included in the received data.

In other words, the head-mounted display 112 may be configured to present the user with computer-generated sensory input, such as at least one of: the visualization 200, the visualization 400, the indication 504, the virtual representation 700, the playback of the recorded video feed 701, the route 702, the digital representation 810, and/or the video feed 801.

The apparatus 100 may track the position, orientation, head direction and gaze direction of the user 120, and the superimposing may be performed based on the tracking.

FIG. 10 illustrates a flow chart according to an example embodiment of a method performed by the apparatus 100. The method of FIG. 10 may be performed in addition or as an alternative to the method of FIG. 9.

Referring to FIG. 10, in block 1001, the apparatus 100 receives data associated with at least one drone 160, wherein the data at least indicates one or more areas covered by at least one camera of the at least one drone 160 in a real-world environment 210.

The data may comprise at least: a location of the at least one drone 160 in the real-world environment 210, a direction of the at least one drone 160, an orientation of the at least one camera, and a frustum of the at least one camera.

The data may further comprise digital twin data of the real-world environment 210.

In block 1002, the apparatus 100 determines, based at least on the data, one or more non-covered areas 301, 302, 303 that have not been covered by the at least one camera of the at least one drone 160.

In block 1003, the apparatus 100 superimposes, on the head-mounted display 112, a visualization indicating the one or more non-covered areas 301, 302, 303 that have not been covered by the at least one camera of the at least one drone 160, wherein the visualization indicating the one or more non-covered areas 301, 302, 303 is superimposed on at least one of: the real-world environment 210 or the virtual map 220.

FIG. 11 illustrates a flow chart according to an example embodiment of a method performed by the apparatus 100.

The method of FIG. 11 may be performed in addition or as an alternative to any of the methods of FIG. 9 and/or FIG. 10.

Referring to FIG. 11, in block 1101, the apparatus 100 detects a point of interest 501 in at least one of: a video feed 502 or a picture 502 from the at least one camera of the at least one drone 160, or the real-world environment 210, or the virtual map 220.

In block 1102, the apparatus 100 determines a location 503 of the point of interest 501 in the real-world environment 210 based on digital twin data of the real-world environment 210.

The apparatus 100 may further determine a distance from the at least one drone 160 or from the user 120 to the location 503 of the point of interest 501.

In block 1103, the apparatus 100 superimposes, on the head-mounted display 112, an indication 504 indicating the location 503 of the point of interest 501, wherein the indication 504 is superimposed on at least one of: the real-world environment 210, the virtual map 220, or the video feed 502 or the picture 502.

The apparatus 100 may further superimpose, on the head-mounted display, a distance metric that indicates the distance from the at least one drone or from the user to the location of the point of interest.

Figure 12:
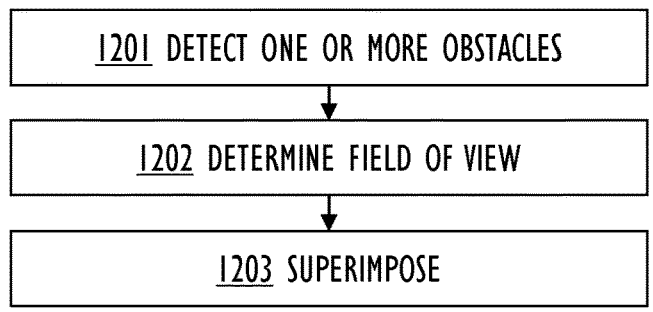
FIG. 12 illustrates a flow chart according to an example embodiment.

FIG. 12 illustrates a flow chart according to an example embodiment of a method performed by the apparatus 100. The method of FIG. 12 may be performed in addition or as an alternative to any of the methods of FIG. 9, FIG. 10 and/or FIG. 11.

Referring to FIG. 12, in block 1201, the apparatus 100 detects one or more obstacles 601 blocking a line of sight between the user 120 and a target 602.

In block 1202, the apparatus 100 determines a two-dimensional or three-dimensional field of view 604, 605 from the target 602 based on a location of the target 602 in relation to the one or more obstacles 601 according to digital twin data of the real-world environment 210.

In block 1203, the apparatus 100 superimposes, on the head-mounted display 112, the two-dimensional or three-dimensional field of view 604, 605 from the target 602, wherein the two-dimensional or three-dimensional field of view 604, 605 is superimposed on at least one of: the real-world environment 210 or the virtual map 220.

The blocks and related functions described above by means of FIGS. 9 to 12 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

In some use cases (e.g., in a team awareness use case), a system of two or more apparatuses 100 may be used to enable multiple users 120 to observe the at least one drone 160 and/or its operations according to any of the example embodiments described above. In this case, each apparatus 100 is adapted to the perspective of its respective user. For example, in case of multiple users and apparatuses 100, at least one of: the visualization 200, the visualization 400, the indication 504, the virtual representation 700, the playback of the recorded video feed 701, the route 702, the digital representation 810, and/or the video feed 801 may be shown in the same place in the real-world environment 210 on the head-mounted display 112 of each user, but from different perspectives depending on the user.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

It will be obvious to a person skilled in the art that, as technology advances, the inventive concept may be implemented in various ways within the scope of the claims. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising:
an internal data communication interface configured to receive data associated with at least one drone, wherein the data includes at least digital twin data of a real-world environment where the at least one drone is in;
a head-mounted display;
one or more memories including computer program code; and
one or more processors configured to execute the computer program code to cause the apparatus to perform at least the following:
detecting one or more obstacles blocking a line of sight between a user and a target;
determining a two-dimensional or three-dimensional field of view from the target based on a location of the target in relation to the one or more obstacles according to the digital twin data of the real-world environment; and
superimposing, on the head-mounted display, the two-dimensional or three-dimensional field of view from the target, wherein the two-dimensional or three-dimensional field of view is superimposed on at least one of: the real-world environment or a virtual map.

2. The apparatus of claim 1, wherein the data further includes at least: a location of the at least one drone in the real-world environment, a direction of the at least one drone, an orientation of at least one camera of the at least one drone, and a frustum of the at least one camera.

3. The apparatus of claim 2, wherein the apparatus is caused to perform:
determining, based at least on the data, one or more non-covered areas that have not been covered by the at least one camera of the at least one drone; and
superimposing, on the head-mounted display, a visualization indicating the one or more non-covered areas that have not been covered by the at least one camera of the at least one drone, wherein the visualization indicating the one or more non-covered areas is superimposed on at least one of: the real-world environment or the virtual map.

4. The apparatus of claim 2, wherein the apparatus is caused to perform:
superimposing, on the head-mounted display, a video feed or a picture of one or more areas from the at least one camera of the at least one drone, wherein the video feed or the picture is superimposed on at least one of: the one or more areas in the real-world environment, or the virtual map.

5. The apparatus of claim 2, wherein the apparatus is caused to perform:

superimposing, on the head-mounted display, a thermal map of one or more areas covered by the at least one camera of the at least one drone, wherein the thermal map is superimposed on at least one of: the one or more areas in the real-world environment, or the virtual map.

6. The apparatus of claim 1, wherein the apparatus is caused to perform:
  detecting a point of interest in a video feed or a picture from at least one camera of the at least one drone;
  determining a location of the point of interest in the real-world environment based on the digital twin data of the real-world environment; and
  superimposing, on the head-mounted display, an indication indicating the location of the point of interest, wherein the indication is superimposed on at least one of: the real-world environment, the virtual map, or the video feed or the picture.

7. The apparatus of claim 1, wherein the apparatus is caused to perform:
  detecting a point of interest in the real-world environment;
  determining a location of the point of interest in the real-world environment based on the digital twin data of the real-world environment; and
  superimposing, on the head-mounted display, an indication indicating the location of the point of interest, wherein the indication is superimposed on at least one of: the real-world environment, the virtual map, or a video feed or a picture from at least one camera of the at least one drone.

8. The apparatus of claim 1, wherein the apparatus is caused to perform:
  detecting a point of interest on the virtual map;
  determining a location of the point of interest in the real-world environment based on the digital twin data of the real-world environment; and
  superimposing, on the head-mounted display, an indication indicating the location of the point of interest, wherein the indication is superimposed on at least one of: the real-world environment, the virtual map, or a video feed or a picture from at least one camera of the at least one drone.

9. The apparatus of claim 1, wherein the apparatus is caused to perform:
  determining a location of a point of interest in the real-world environment based on the digital twin data of the real-world environment;
  determining a distance from the at least one drone or from the user to the location of the point of interest; and
  superimposing, on the head-mounted display, a distance metric that indicates the distance from the at least one drone or from the user to the location of the point of interest.

10. The apparatus of claim 1, wherein the apparatus is caused to perform:
  superimposing, on the head-mounted display, a playback of a recorded mission of the at least one drone by using a virtual representation of the at least one drone, wherein the playback of the recorded mission is superimposed on at least one of: the real-world environment or the virtual map.

11. The apparatus of claim 1, wherein the apparatus is caused to perform:
  superimposing, on the head-mounted display, a playback of a recorded video feed from at least one camera of the at least one drone, wherein the playback of the recorded video feed is superimposed on a corresponding area covered by the recorded video feed on at least one of: the real-world environment or the virtual map.

12. The apparatus of claim 1, wherein the apparatus is caused to perform:
  superimposing, on the head-mounted display, a route traveled by the at least one drone, wherein the route is superimposed on at least one of: the real-world environment or the virtual map.

13. The apparatus of claim 1, wherein the apparatus is caused to perform:
  superimposing, on the head-mounted display, a digital representation of the real-world environment based on the virtual map, such that a point of view of the user relative to the digital representation is positioned at a location of at least one camera of the at least one drone; and
  superimposing, on the head-mounted display, a video feed of an area of the real-world environment from the at least one camera of the at least one drone, wherein the video feed is superimposed on a corresponding area of the digital representation of the real-world environment, such that the video feed remains fixed to the corresponding area of the digital representation if the head of the user is moving.

14. A system comprising two or more apparatuses of claim 1.

15. A method comprising:
  receiving data associated with at least one drone, wherein the data includes at least digital twin data of a real-world environment where the at least one drone is in;
  detecting one or more obstacles blocking a line of sight between a user and a target;
  determining a two-dimensional or three-dimensional field of view from the target based on a location of the target in relation to the one or more obstacles according to the digital twin data of the real-world environment; and
  superimposing, on the head-mounted display, the two-dimensional or three-dimensional field of view from the target, wherein the two-dimensional or three-dimensional field of view is superimposed on at least one of: the real-world environment or a virtual map.

16. A non-transitory computer readable medium comprising program instructions which, when executed by an apparatus, cause the apparatus to perform at least the following:
  receiving data associated with at least one drone, wherein the data includes at least digital twin data of a real-world environment where the at least one drone is in;
  detecting one or more obstacles blocking a line of sight between a user and a target;
  determining a two-dimensional or three-dimensional field of view from the target based on a location of the target in relation to the one or more obstacles according to the digital twin data of the real-world environment; and
  superimposing, on the head-mounted display, the two-dimensional or three-dimensional field of view from the target, wherein the two-dimensional or three-dimensional field of view is superimposed on at least one of: the real-world environment or a virtual map.

* * * * *